United States Patent [19]

Asai et al.

[11] 4,345,959

[45] Aug. 24, 1982

[54] PROCESS FOR PRODUCING THERMOSETTING RESIN FILM

[75] Inventors: Hajime Asai; Hisashi Tada; Takeo Gomi, all of Ootake, Japan

[73] Assignee: Mitsubishi Rayon Company, Limited, Tokyo, Japan

[21] Appl. No.: 175,537

[22] Filed: Aug. 5, 1980

[51] Int. Cl.³ .............................................. B29D 7/02
[52] U.S. Cl. ........................... 156/244.11; 156/244.27; 156/289; 156/330
[58] Field of Search .............. 156/243, 244.11, 244.12, 156/244.27, 289, 330; 264/176 R, 213; 425/113, 114, 224, 376 R, 377, 436 R; 428/352

[56] References Cited

U.S. PATENT DOCUMENTS

| 3,043,738 | 7/1962 | Demeter et al. | 425/113 |
| 3,253,073 | 5/1966 | Skobel | 156/244.11 |
| 3,600,750 | 8/1971 | Stroszynski | 425/113 |
| 3,784,433 | 1/1974 | Garnish et al. | 156/330 |
| 4,180,608 | 12/1979 | Del | 156/330 |

*Primary Examiner*—Caleb Weston
*Attorney, Agent, or Firm*—Oblon, Fisher, Spivak, McClelland & Maier

[57] ABSTRACT

A non-solvent type thermosetting resin film exhibiting excellent uniformity in thickness is prepared by a process wherein a molten thermosetting resin composition having a curing agent incorporated therein is extruded through a linear slit of a flat die, maintained at a constant temperature, onto a release sheet continuously moving at a constant rate in close proximity to the exit end of the linear slit. As the flat die a flat sheeting die having a substantially circular manifold is used and the molten thermosetting resin is extruded onto the release sheet, which is supported by a back-up roll and confronts the exit end of the linear slit of the flat sheeting die.

14 Claims, 6 Drawing Figures

PROCESS FOR PRODUCING THERMOSETTING RESIN FILM

BACKGROUND OF THE INVENTION (1) Field of the Invention

This invention relates to a process for producing a film or a film-like product of a non-solvent type thermosetting resin, which is substantially free from a thermoplastic resin.

The film or film-like product obtained by the process of the present invention exhibits excellent uniformity in thickness and viscosity, and the thermosetting resin constituting the film or film-like product is homogeneous and free from a cross-linked infusible product of the thermosetting resin. Such a film or film-like product is useful as an adhesive film, particularly as a matrix resin of a film form used for a fiber-reinforced plastic prepreg.

By the term "film or film-like product" used herein we mean a film, sheet or another analogous thin product. This term is hereinafter referred to as "film" for brevity.

(2) Description of the Prior Art

In general it is difficult to produce a thermosetting resin film. Most conventional thermosetting resin films have been prepared by a process wherein a solution of a thermosetting resin in a suitable solvent is coated onto a release sheet and, then, the coated layer is heated tp volatilize the solvent. Thermosetting resins are readily converted into a three-dimensional cross-linked structure upon heating. Thus, when a solvent-free thermosetting resin film is produced by the above-mentioned conventional process, the resulting film is liable to possess infusible portions due to inevitable non-uniformity in heating and, consequently, not be uniform in its thermosetting properties. Furthermore, it is essential to remove the solvent from the coated thermosetting resin solution in the course of producing the solvent-free thermosetting resin film. The removal of the solvent necessitates the employment of a complicated production apparatus which requires a large amount of energy.

In order to obviate the above-mentioned defects, some proposals have heretofore been made for the production of a non-solvent type thermosetting resin film. For example, U.S. Pat. No. 3,784,433 discloses a process wherein a thermosetting resin, such as an epoxide resin, which is heated to about 260° C. and in which a thermoplastic resin, such as a polysulfone, has been dissolved, is cooled to about 120° C.; curing agent is added to the cooled resin mixture; and then, the resin mixture is pressed or cast into a film. However, this process has the following disadvantages. First, a salient amount, e.g., about 20% by weight, of a thermoplastic resin, such as a polysulfone, must be incorporated in a thermosetting resin, such as an epoxide resin, in order to obtain the intended non-solvent type thermosetting resin film. Secondly, the thermosetting resin must be exposed to an undesirably high temperature, e.g., about 260° C., in order to dissolve the polysulfone therein. Thirdly, it is very difficult to continuously produce a film of uniform thickness by the pressing or casting procedure.

SUMMARY OF THE INVENTION

It is, therefore, an object of the present invention to provide a process for producing a thermosetting resin film by a melt-shaping procedure without substantial use of a solvent and a thermoplastic resin.

It is another object of the present invention to provide a process for producing a thermosetting resin film of satisfactory properties which is not accompanied by large energy consumption and air pollution and does not expose the thermosetting resin to an undesirably high temperature exceeding about 100° C.

It is still another object of the present invention to provide a non-solvent type thermosetting resin film having a uniform thickness, which film contains no gel and exhibits uniform thermofusible and thermosettable properties.

It is still another object of the present invention to provide a matrix resin material of a film form composed of a non-solvent type thermosetting resin, which material is useful for a fiber-reinforced plastic prepreg.

Other objects and advantages of the present invention will be apparent from the following description.

In accordance with the present invention, there is provided an improved process for producing a thermosetting resin film, wherein a molten thermosetting resin composition having a curing agent incorporated therein is extruded through a linear slit of a flat sheeting die maintained at a temperature lower than 100° C., having a substantially circular manifold and maintained at a constant temperature, onto a release sheet continuously moving at a constant rate in close proximity to the exit of the linear slit. The molten thermosetting resin composition is extruded onto the release sheet supported by a back-up roll and confronting the exit of the linear slit.

DESCRIPTION OF THE PREFERRED EMBODIMENTS

Figure 2:
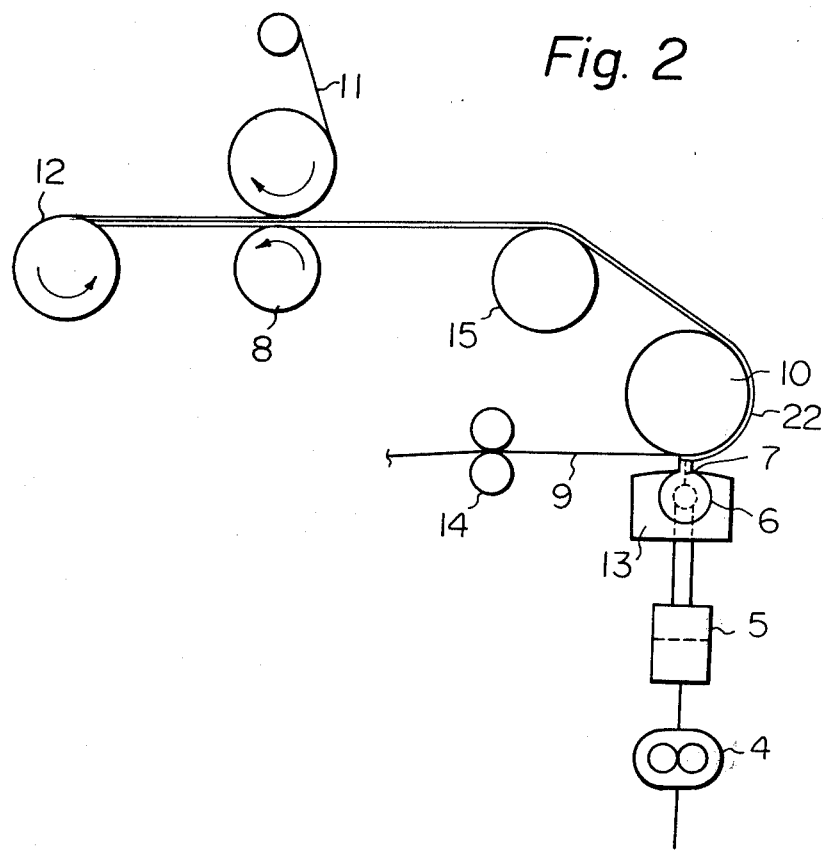
FIG. 2 is a schematic illustration of an apparatus suitable for carrying out the process of the present invention.

Referring to FIG. 2, schematically illustrating an apparatus suitable for carrying out the process of the present invention, a molten thermosetting resin composition having a curing agent incorporated therein is supplied from a gear pump 4 through a filter 5 into a substantially circular manifold of a flat sheeting die 6 provided with a linear slit 7 and maintained at a constant temperature by a jacket 13. A release sheet 9 is supplied at a constant rate through a pair of tension-controlling rollers 14 to the periphery of a back-up roll 10. In close proximity to the exit end of the linear slit 7 of the flat sheeting die 6, the release sheet 9 is continuously coated with the molten thermosetting resin composition issuing from the linear slit 7. The resin coated sheet 9 is cooled on a cooling roller 15. A releasable film 11 is superposed on the resin coated sheet 9 for the protection of the thermosetting resin composition, by a pair of traction rollers 8. The resin coated sheet 9 and the releasable film 11 superposed on the sheet 9 are wound around a winding roller 12.

Figure 1:
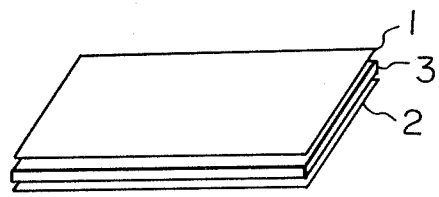
FIG. 1 is a schematic illustration of a non-solvent type thermosetting resin film prepared by the process of the present invention.

If desired, the wound laminated sheet is cut into a desired size to obtain a laminated sheet illustrated in FIG. 1, which is comprised of the release sheet 2, the non-solvent type thermosetting resin 3 and the release film 1.

The linear slit 7 of the flat sheeting die 6 may be directed to any desired direction. It is preferable, however, that the linear slit 7 be directed upward so that the molten thermosetting resin composition issues approximately vertically upward therefrom. This upward arrangement of the linear slit makes it possible more precisely to control the thickness of the resulting thermosetting resin film.

It is preferable to arrange a back-up roll 10 on the side of the release sheet 9 opposite to the side which is coated with the molten resin, as illustrated in FIG. 2. If no back-up roller is used, the distance between the surface of the release sheet and the exit end of the linear slit of the flat sheeting die is liable to fluctuate due to the pressure change of the molten resin. Instead of the back-up roll 10, a suitable rod (not shown) may be used.

Figure 3:
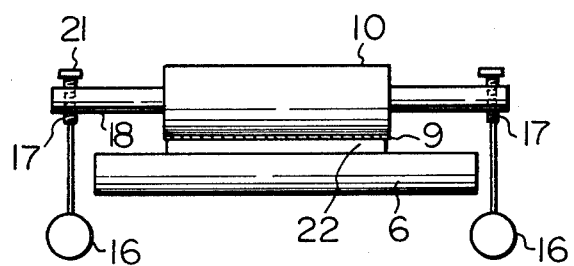
FIG. 3 is a front view of a back-up roll and a roll space adjusting apparatus used in the process of the present invention.
Figure 4:
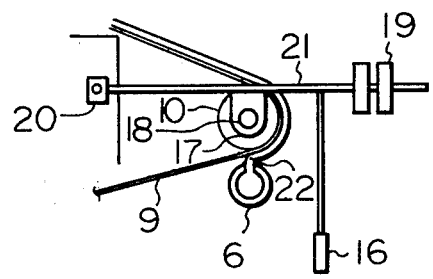
FIG. 4 is a side elevational view of the back-up roll and the roll space adjusting apparatus illustrated in FIG. 3; and, FIGS. 5 and 6 are schematic illustrations of the back-up roll and the roll space adjusting apparatus, which are not being operated under normal conditions.
Figure 5:
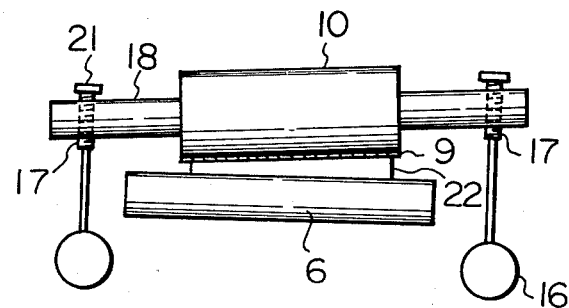
Figure 6:
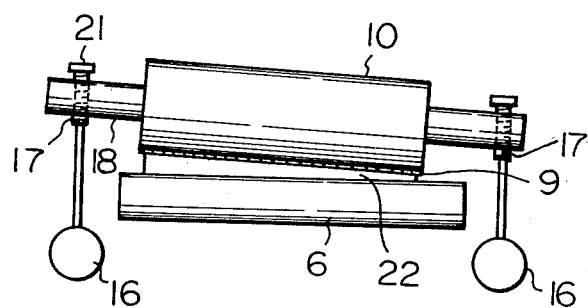

A roll space adjusting apparatus is provided in the back-up roller 10 or the rod (not shown) in order to maintain constant the distance between the back-up roll or the rod and the exit end of the linear slit of the flat sheeting die. A typical example of the roll space adjusting apparatus is illustrated in FIGS. 3 and 4. Referring to FIGS. 3 and 4, the roll space adjusting apparatus comprises self-aligning bearings 17, weights 19, supporting bearings 20 and supporting rods 21. The back-up roll is preferably fitted, in both end portions of the shaft of the back-up roll, with means for measuring the variance of the distance between the shaft of the back-up roll and the exit end of the linear slit of the flat sheeting die. As the means for measuring the variance of said distance, dial gauges or differential transformers 16 may be used. The roll space adjusting apparatus shown in FIGS. 3 and 4 is being operated under normal conditions wherein the distance between the surface of the release sheet 9 and the exit end of the linear slit of the flat sheeting die 6 is maintained precisely constant over the entire length of the linear slit 7. In contrast, if the roll space adjusting apparatus is not being operated under normal conditions, the distance between the release sheet 9 and the exit end of the linear slit 7 of the flat sheeting die 6 is not constant over the length of the linear slit 7 as illustrated in FIGS. 5 and 6, and consequently, the thermosetting resin film formed on the release sheet is not uniform in thickness along the transverse direction thereof. If no roll space adjusting apparatus is used, the above-mentioned distance is also not constant over the length of the linear slit and the thermosetting resin film is not uniform in thickness along the transverse direction.

The main feature of the process of the present invention resides in the fact that the molten resin composition is extruded onto the release sheet, which is supported by a back-up roll and moves in close proximity to the exit end of the linear slit. The control of the extrusion rate of the molten resin composition can be effected by pressing the release sheet against the exit of the linear slit, especially the upwardly directed linear slit, by using a back-up roll fitted with self-aligning bearing means.

In general thremosetting resins have very poor thermal resistance. If thermosetting resins are stagnant within a flat die, the resins are subject to cross-linking and, consequently, the resulting films contain gels. The use of a flat sheeting die having a substantially circular manifold in the process of the invention is advantageous in that a thermosetting resin is not stagnant within the flat sheeting die and, thus, the resin is not readily subject to cross-linking. Furthermore, when a two end-type flat sheeting die is employed, namely, the molten thermosetting resin is introduced into the substantially circular manifold of the flat sheeting die through both ends of the manifold, the molten thermosetting resin is very uniformly extruded from the linear slit. If the molten thermosetting resin is introduced into the manifold not through both ends of the manifold but, for example, through an intermediate point of the manifold, the extrusion rate of the molten thermosetting resin is not uniform along the length of the linear slit.

The thermosetting resins used in the process of the invention are not particularly limited provided that the resins are solid at room temperature and can become fluid when they are heated at a temperature lower than the minimum temperature at which the thermosetting resins are cured, particularly lower than 100° C. The thermosetting resins used include, for example, epoxy resins, unsaturated polyester resins, diallyl phthalate resins and phenol resins. Preferably are epoxy resins, such as bispheno-A type epoxy resins, novolak type epoxy resins, alicyclic type epoxy resins, polyepoxy compounds of a polyhydric alcohol and polyepoxy compounds of a polyamine. These epoxy resins are used more preferably in the B-stage, wherein the epoxy resins have been partially reacted with a cross-linking agent, than in the A-stage, wherein the epoxy resins are in a monomer form that is, in a monomeric precursor form. The cross-linking agent used includes, for example, aliphatic amines, such as ethylenediamine, diethylenetriamine, diethylamine and propylamine; aromatic amines, such as m-phenylenediamine, diaminodiphenylmethane and diaminodiphynylsulfone; and urea derivatives, such as 3-(3,4-dichlorophenyl)-1,1-dimethylurea. If desired, the thermosetting resins used may have organic and/or inorganic fillers incorporated therein, which fillers include, for example, calcium carbonate, magnesium oxide and glass beads.

The curing agents to be incorporated in the thermosetting resins include, for example, aliphatic and aromatic amines, such as those listed above with respect to the cross-linking agents; urea derivatives, such as 3-(3,4-dichlorophenyl)-1,1-dimethylurea; boron trifluoride; and peroxides, such as 2,5-dimethyl-2,5-di(tert.-butyl peroxy)hexane, di-tert.-butyl peroxide, dicumyl peroxide, 1,1-bis(tert. butyl peroxy)-3,3,5-trimethylketal, tert.-butyl perbenzoate and benzoyl peroxide.

The incorporation of the curing agents in the thermosetting resins is effected in a heated state. It should be noted, however, that, unless the incorporation of the curing agents is completed within a short period of time, the resulting thermosetting resin composition sometimes contains unfusible polymeric materials which possess an undesirably high molecular weight or have been partially cross-linked. Such a thermosetting resin composition is not suitable for the intended uniform thermosetting resin film. It now has been found that uniform blending of the curing agents with the thermosetting resins can be carried out effectively and within a short period of time when the curing agents and the thermosetting resins are blended together by using a mixer such as a pipeline mixer or an extruder. As the mixer, a pipeline mixer is optimum for the following reasons. First, a pipeline mixer has no stagnation of the molten thermosetting resin therein. Secondly, a pipeline mixer has a high heat exchange capacity as compared with other mixers, and therefore, the molten thermosetting resin is not subject to local overheating and can be uniformly heated. Thirdly, the temperature of the molten thermosetting resin can be precisely controlled.

The curing agent may be incorporated in a solution form obtained by incorporating the curing agent in a monomer, or monomeric precursor, of the thermosetting resin.

It is preferable that the mixer be maintained at a temperature of lower than 100° C. The temperature of the mixer may be either uniform over the entire length thereof, or different along the length thereof (i.e., the temperature at the inlet portion thereof may be different from that at the outlet portion thereof, for example, by providing the mixer with a temperature-controlling jacket). Illustrations of the pipeline mixer are a static type pipeline mixer having mixing elements such as, for example, one supplied by Kenics Co., and a motionless pipeline mixer such as, for example, a T. K. Ross. L.P.D. mixer, supplied by Dow Chemical Co. The shape and number of the mixing elements fitted in the pipeline mixer and the diameter of the pipeline may suitably be determined depending upon the flow rate and temperature of the molten thermosetting resin and the particular curing agent.

The release sheets used in the process of the invention are not particularly limited provided that they are neither drawn nor shrunk at a temperature at which the molten thermosetting resin is extruded onto them, and that they possess practically acceptable dimensional stability and mechanical strengths. The release sheets include, for example, those which are made of paper, nonwoven fabrics, woven fabrics and plastic films. Preferable release sheets are those which have been treated with silicone resins or fluorine-containing resins.

The release films to be superposed upon the thermosetting resin layer are also not particularly limited and may be made of the materials mentioned above with respect to the release sheets. However, the release films should be less adhesive to the thermosetting resin than the release sheets. If the adhesiveness of the release films to the thermosetting resin is larger than that of the release sheets to the thermosetting resin, the thermosetting resin film is liable to be distored when the release sheets and the release films are separated from the thermosetting resin film. Therefore, preferable release films are made of polypropylene, polyethylene, cellophane and polyester. Furthermore, preferable release films are thinner than the release sheets.

It is preferable that the distance between the release sheet and the exit end of the linear slit be maintained in the range of from approximately 0.01 to approximately 5 mm. The length of the linear slit is preferably in the range of from approximately 0.3 to approximately 3 mm.

The thickness of the thermosetting resin film formed on the release sheet is represented by the formula (I):

Film thickness = Extrusion rate of resin/(Travelling speed of release sheet × Film width)  (I)

The travelling speed of the release sheet can be precisely controlled by tracting means, such as a pair of nip rollers 8 (illustrated in FIG. 2). The tension applied to the release sheet sometimes fluctuates. This fluctuation can be avoided or minimized by tension-controlling means 14 (illustrated in FIG. 2). It is preferable that the molten thermosetting resin coated on the relase sheet be cooled as early as possible. Therefore, the cooling roller 15 is preferably located in close proximity to the back-up roll 10 (as illustrated in FIG. 2).

The thermosetting resin film prepared by the process of the invention exhibits good handling properties and is useful as a non-solvent type adhesive or binder for laminated materials, composite materials and metallic materials, and a matrix resin for fiber-reinforced plastic articles.

The invention will be further illustrated by the following examples wherein parts are by weight.

EXAMPLE 1

70 Parts of Epikote 828 (trade name, a bisphenol-A type epoxy resin supplied by Shell Chemical Co.) and 30 parts of boron trifluoride monoethylamine complex were mixed together under agitation at a temperature of 40° C., followed by cooling to a temperature of 30° C. The obtained resin composition is referred to as "resin composition A."

Diaminodiphenylmethane was partially reacted with the same bisphenol-A type epoxy resin as mentioned above to obtain 5 kg of a resin composition of a B-stage which was solid at room temperature and contained unreacted diaminodiphenylmethane. This resin composition is referred to as "resin composition B." The resin composition was heated to a temperature of 70° C. to be thereby melted.

The resin composition A and the molten resin composition B were supplied into a pipeline mixer at a proportion of 1/10 by weight. The pipeline mixer used was a standard type static mixer (supplied by Kenics Co.) having twenty mixing elements and maintained at a temperature of 60° C. by warm water. The thermosetting resin composition obtained by mixing the resin compositions A and B using the pipeline mixer is referred to as "resin composition I."

A thermosetting resin film was prepared from the resin composition I by using an apparatus similar to that illustrated in FIG. 2. That is, the molten resin composition I was metered by a gear pump 4 and filtered by a filter 5. The filtered molten resin composition I was forced into the circular manifold of a flat sheet die 6 having an actual volume of 200 ml through both ends of the manifold. The flat sheeting die 6 was maintained at a temperature of 50° C. by circulating warm water in a jacket 13. The molten resin composition I was upwardly extruded at a flow rate of 55 ml/min. through the linear slit 7 of the die 6, which slit had a width of 1.5 mm and a height of 190 mm. A release paper 9 of 250 mm width and 100 microns thickness was travelled at a speed of 5 m/min., whilst the paper was pressed against the exit end of the linear slit 7 by a back-up roll. The molten thermosetting resin extruded on the release paper 9 was cooled by a cooling roller 15. The cooled thermosetting resin film had a thickness of 55 microns. A polyethylene film 11 having a thickness of 20 microns, which was more releasable than the release paper 9, was superposed upon the thermosetting resin film and wound around a winding roller 12.

A roll space adjusting apparatus similar to that illustrated in FIGS. 3 and 4 was used. By the use of this apparatus, i.e., by adjusting the weights 19 while measuring the distance between the release paper 9 and the exit end of the linear slit 7 by using dial gauges 16, the thickness of the resultant thermosetting resin film could be made uniform over the entire width of the resin film. The non-solvent type thermosetting resin film, so obtained, had a thickness of 55 microns and a width of 200 mm.

The above-mentioned procedure was repeated, except that the flow rate of the thermosetting resin extruded through the linear slit was changed to 10 ml/min., with all other conditions remaining substantially the same. The resultant non-solvent type thermosetting resin film had a thickness of 10 microns and a width of 200 mm.

Both of the above-mentioned non-solvent type thermosetting resin films exhibited good adhesion even after they were stored for three months at room temperature. When each of the thermosetting resin films was sandwiched between metal sheets and cured at a temperature of 150° C. for three hours, the metal sheets could be strongly adhered to each other.

EXAMPLE 2

100 Parts of a bisphenol-A type epoxy resin similar to that used in EXAMPLE 1 and 12 parts of 3-(3,4-dichlorophenyl)-1,1-dimethylurea (curing agent) were mixed together at a temperature of 40° C. to obtain a resin composition C.

100 Parts of Epikote 154 (tradename, a novolak type epoxy resin supplied by Shell Chemical Co.) and 20 parts of dicyandiamide (curing agent) were mixed together at a temperature of 50° C. to obtain a resin composition D.

3 Kg of the resin composition C maintained at a temperature of 30° C. and 3 Kg of the resin composition D maintained at a temperature of 40° C. were supplied into a pipeline mixer. The flow rate of each of the resin compositions C and D was 50 ml/min. The resultant mixed resin composition is referred to as "resin composition II."

Using the resin composition II, a non-solvent type thermosetting resin film was prepared in a manner similar to that mentioned in EXAMPLE 1, except that the flat sheeting die was maintained at a temperature of 40° C. by warm water, with all other conditions remaining substantially the same. No trouble was encountered in the preparation of the film.

EXAMPLE 3

3 Kg of the resin composition II prepared in EXAMPLE 2 and 3 Kg of Sumiepoxy ELM-120 (trade name, N,N'-diglycidylamino group-containing epoxy resin supplied by Sumitomo Chemical Co., herein referred to as "epoxy resin E") were separately heated to a temperature of 70° C. The heated resin composition II and the heated epoxy resin E were supplied into a pipeline mixer similar to that used in EXAMPLE 1, at a proportion of ⅓ by weight, to obtain a resin composition III.

Using an apparatus similar to that employed in EXAMPLE 1, a non-solvent type thermosetting resin film was prepared from the resin composition III in a manner similar to that mentioned in EXAMPLE 1, except that the flat sheeting die was maintained at a temperature of 60° C. by warm water and the outlet of the pipeline mixer was connected to the inlets of the circular manifold of the flat sheeting die. All other conditions remained substantially the same. The resultant resin film had a width of 200 mm and a thickness of 330 microns, and the limits of variation in thickness were extremely small. It was found by dissolving the resin film in a solvent that the resin film contained no polymer gel.

The above-mentioned procedure was repeated, except that the travelling speed of the release paper was changed to 0.5 m/min., with all other conditions remaining substantially the same. The resultant non-solvent type thermosetting resin film had a uniform thickness of 3.3 mm.

A polyethylene release film adhered onto each of the obtained thermosetting resin films was separated from the thermosetting resin film. A plain woven glass fabric was superposed upon the exposed surface of the thermosetting resin film. A release paper having a thickness of 100 microns was adhered onto the plain woven glass fabric. Thereafter, the resultant laminated sheet was pressed at a temperature of 100° C. and a pressure of 0.5 Kg/cm$^2$, for 5 minutes, to obtain a prepreg having a structure such that the plain woven glass fabric was uniformly impregnated with the thermosetting resin. The prepreg contained 40% by weight of the thermosetting resin.

EXAMPLE 4

75 Parts of a diallyl isophthalate prepolymer having a softening point of 70° C. and an iodine value of 64, 25 parts of a diallyl isophthalate monomer and 3 parts of tert-butyl perbenzoate were supplied into a kneader maintained at a temperature of 60° C., where the three ingredients were mixed together to obtain a thermosetting resin composition IV.

Using an apparatus similar to that employed in EXAMPLE 1, a non-solvent type thermosetting resin film was prepared from the thermosetting resin composition IV in a manner similar to that mentioned in EXAMPLE 1. The resultant resin film had a width of 200 mm and a thickness of 50 microns. The thickness was very uniform.

The resin film was superposed on an aluminum sheet and, then, pressed at a temperature of 140° C. for 5 minutes, whereby a hard, transparent and smooth decorative surface layer could be formed on the aluminum sheet.

We claim:

1. An improvement in a process for producing a thermosetting resin film, wherein a molten heat curable thermosetting resin composition which is fluid at less than 100° C. and has a curing agent incorporated therein is extruded through a linear slit of a flat die, maintained at a constant temperature, onto a release sheet continuously moving at a constant rate in close proximity to the exit end of the linear slit, said improvement comprising (i) using as a non-solvent thermosetting resin in the molten thermosetting resin composition a resin which is fluid at a temperature of less than 100° C. and which is solid at room temperature, the molten thermosetting resin composition being a non-solvent type thermosetting resin composition which is prepared in the absence of a solvent by mixing in a mixer the ingredients of the composition which consists essentially of thermosetting resin, a monomeric precursor for the resin and curing agent with or without unreacted cross-linking agent and filler, the curing agent being dissolved in the monomeric precursor, (ii) using as the flat die a flat sheeting die having a substantially circular manifold into which the thermosetting resin composition is fed and (iii) extruding the molten thermosetting resin composition maintained at a temperature of lower than 100° C. onto the release sheet supported by a back-up roll and confronting the exit of the linear slit of said flat sheeting die; said back-up roll being fitted with self-aligning bearing means.

2. The process according to claim 1, wherein the molten thermosetting resin composition is fed into the substantially circular manifold of the flat sheeting die through both ends of the manifold.

3. The process according to claim 1 or 2, wherein said back-up roll is fitted, in both end portions of the shaft of the back-up roll, with means for measuring the variance of said distance between the shaft of the back-up roll and the exit end of the linear slit of the flat sheeting die.

4. The process according to claim 1 or 2, wherein the linear slit of the flat sheeting die is upwardly directed.

5. The process according to claim 3, wherein, as the means for measuring the variance of said distance, dial gauges or differential transformers are used.

6. The process according to claim 1, wherein the thermosetting resin film formed on the release sheet is cooled and a release film is adhered onto the exposed surface of the cooled thermosetting resin film.

7. The process according to claim 6, wherein the release film is more readily releasable from the thermosetting resin film than the release sheet.

8. The process according to claim 1 or 2, wherein the flat sheeting die is maintained at a temperature of lower than 100° C.

9. The process according to claim 1, wherein the mixer is a pipeline mixer.

10. The process according to claim 1, wherein the non-solvent type thermosetting resin is at least one resin selected from the group consisting of epoxy resins and unsaturated polyester resins.

11. The process according to claim 10, wherein the epoxy resins are in a B stage.

12. The process according to claim 9, wherein the pipeline mixer is maintained at a temperature of lower than 100° C.

13. The process according to claim 12, wherein the non-solvent thermosetting resin is an epoxy resin.

14. The process according to claim 9 or 13, wherein the linear slit of the flat sheeting die is upwardly directed.

UNITED STATES PATENT AND TRADEMARK OFFICE
CERTIFICATE OF CORRECTION

PATENT NO. : 4,345,959
DATED : August 24, 1982
INVENTOR(S) : Hajime Asai et al

It is certified that error appears in the above—identified patent and that said Letters Patent is hereby corrected as shown below:

On The Title Page,
Please correct the Foreign Application Priority Data as follows:

[30] -- Foreign Application Priority Data

August 6, 1979 [JP] Japan......100057/79 --

Signed and Sealed this

Twenty-sixth Day of October 1982

[SEAL]

Attest:

GERALD J. MOSSINGHOFF

Attesting Officer

Commissioner of Patents and Trademarks